United States Patent

Carré

[11] 4,220,953
[45] Sep. 2, 1980

[54] CIRCUIT ARRANGEMENT FOR IMPROVING ACCURACY OF ANGULAR MEASUREMENTS IN RADAR SYSTEMS

[75] Inventor: Roland Carré, Paris, France
[73] Assignee: Thomson-CSF, Paris, France
[21] Appl. No.: 918,791
[22] Filed: Jun. 26, 1978
[30] Foreign Application Priority Data
Jun. 27, 1977 [FR] France .................. 77 19617
[51] Int. Cl.² ........................................... G01S 9/22
[52] U.S. Cl. ........................................... 343/16 M
[58] Field of Search ............ 343/16 M, 7 A, 100 LE
[56] References Cited
U.S. PATENT DOCUMENTS

| 3,396,395 | 8/1968 | Ball et al. | 343/16 M |
| 3,599,208 | 8/1971 | Nelson | 343/16 M |
| 3,801,983 | 4/1974 | Woolley | 343/16 M |
| 3,890,617 | 1/1975 | Moulton | 343/16 M |
| 4,012,740 | 3/1977 | Lenneper | 343/16 M |
| 4,023,172 | 5/1977 | Schmidt | 343/16 M |
| 4,064,510 | 12/1977 | Chabah | 343/16 M |

*Primary Examiner*—Malcolm F. Hubler
*Attorney, Agent, or Firm*—Karl F. Ross

[57] ABSTRACT

To improve the accuracy of angular measurements in a radar system by suppressing noise due to target glint, an angular-deviation signal ε derived from the output signals Σ and Δ of a sum channel and a difference channel is gated so as to be read only when the sum signal Σ is at or near a maximum. In a more elaborate embodiment, passage of the deviation signal ε is also blocked when a quadrature-deviation signal εq, likewise derived from the sum and difference signals Σ and Δ, has an absolute magnitude above a preferably adjustable threshold.

7 Claims, 9 Drawing Figures

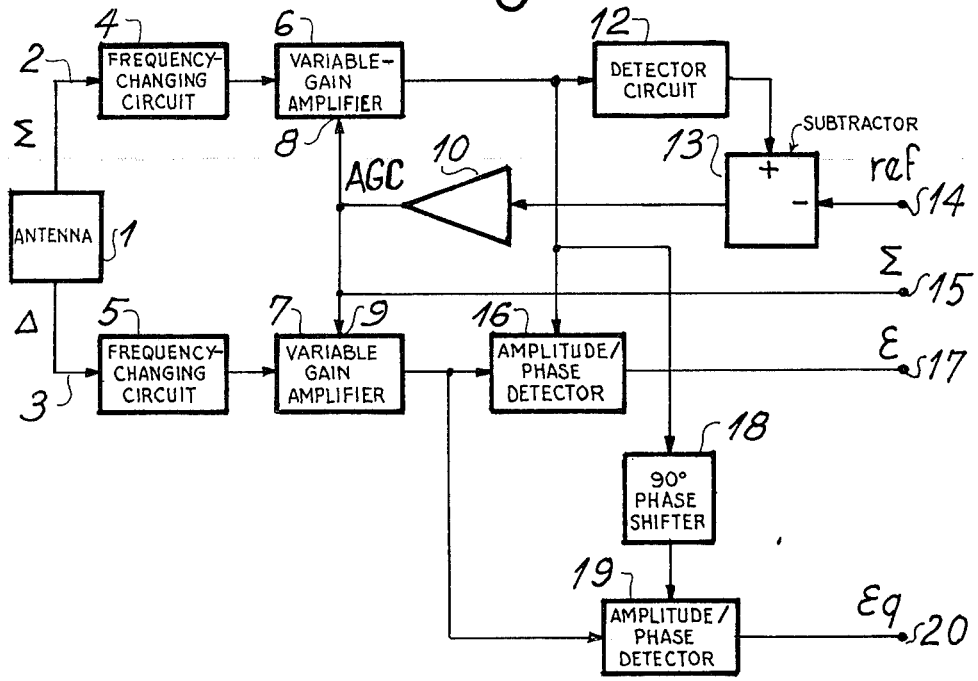
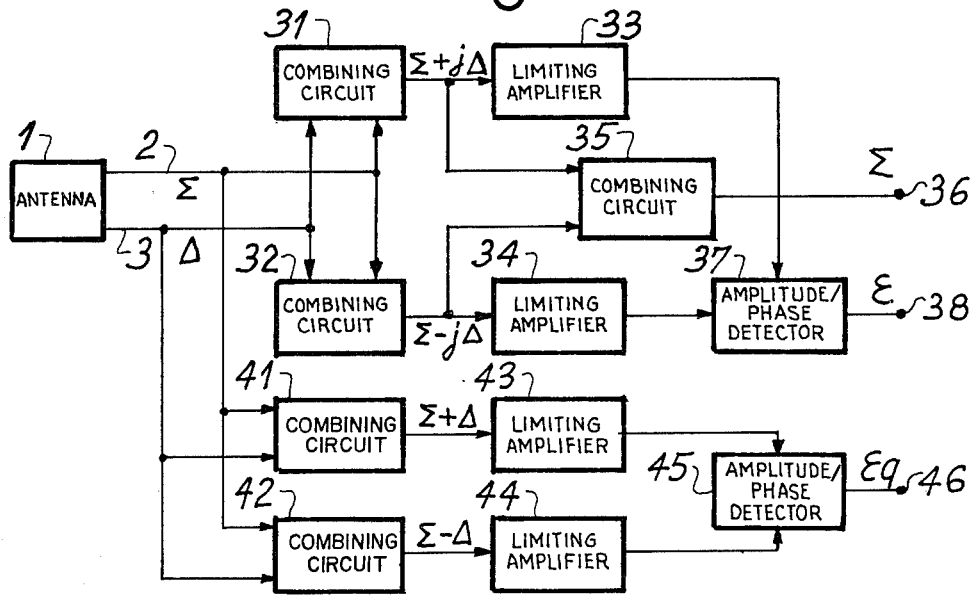

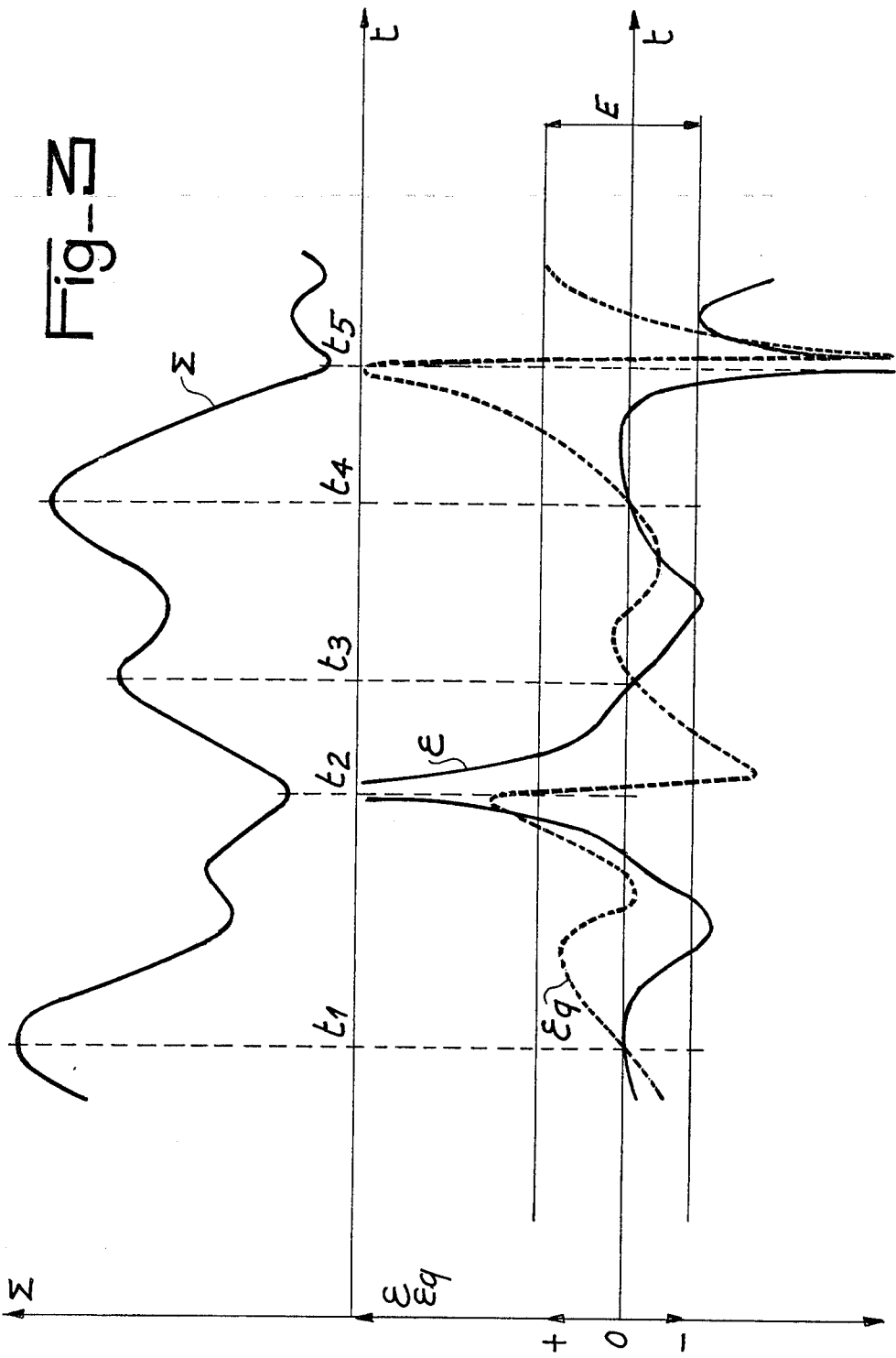

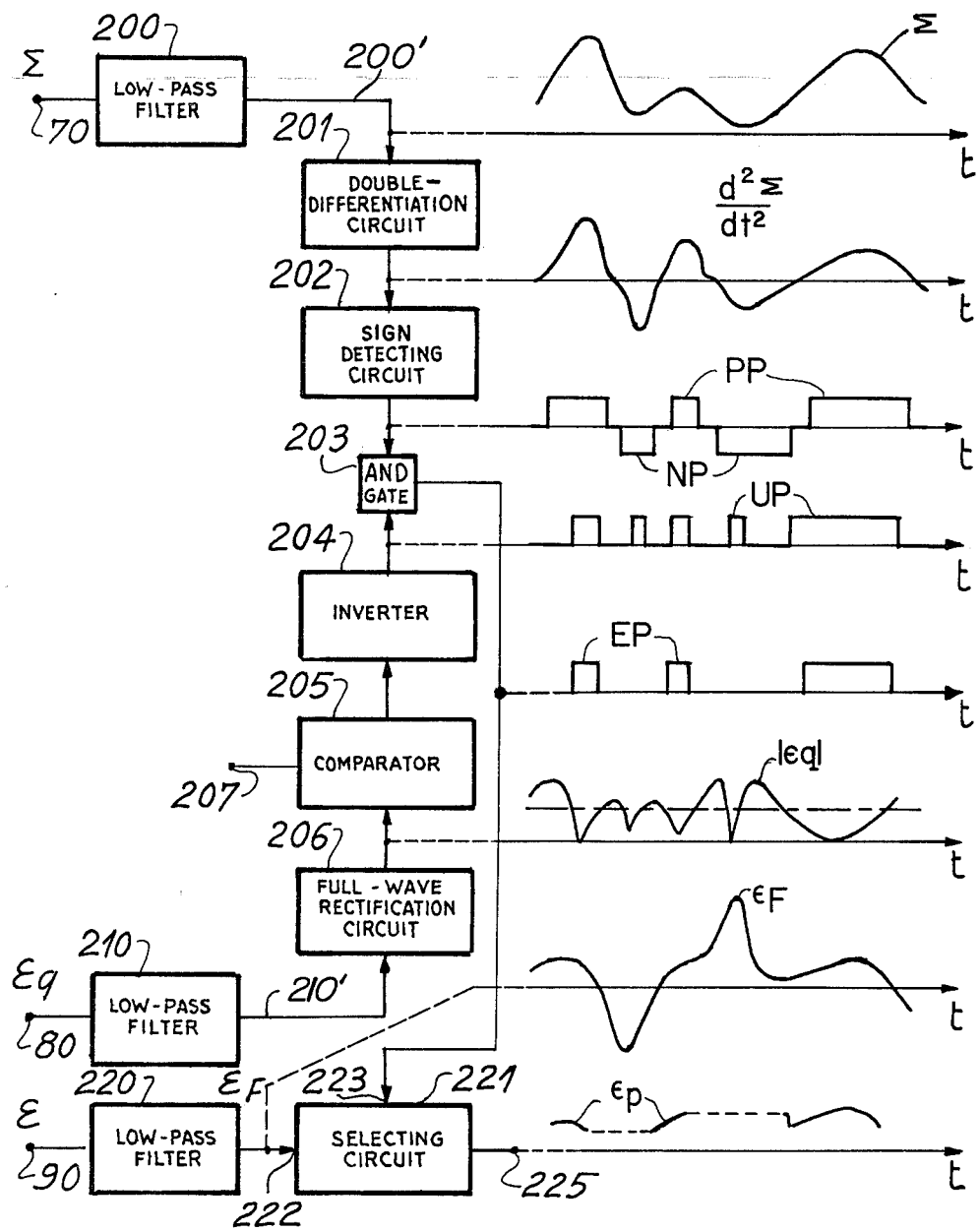

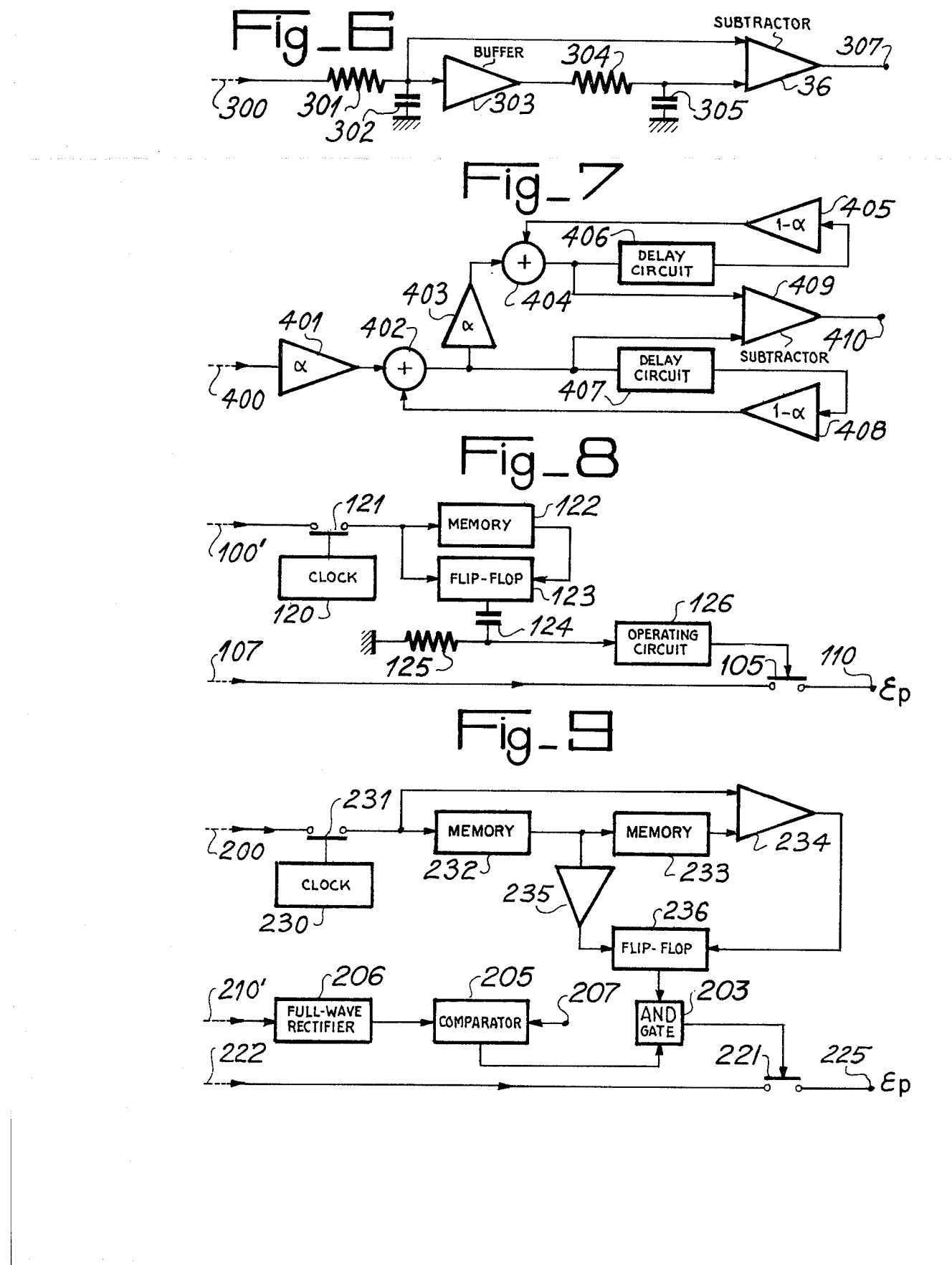

Fig_6, Fig_7, Fig_8, Fig_9

CIRCUIT ARRANGEMENT FOR IMPROVING ACCURACY OF ANGULAR MEASUREMENTS IN RADAR SYSTEMS

FIELD OF THE INVENTION

The present invention relates to circuit arrangements for reducing angular measurement noise in a radar.

BACKGROUND OF THE INVENTION

Angular measurements in a monopulse radar are made by deviation-measuring procedures based on a comparison between two or more different antenna patterns aimed at the same target. There may be one or more such measurements, e.g. in azimuth and in elevation.

The angular measurements are performed by producing an electrical signal whose amplitude or whose positive or negative voltage value is representative of the measurement. Such measurements are affected by noise resulting from the movements of the target in relation to the radar. This noise restricts the performance of radar systems and in particular that of automatic tracking systems.

Angular-measurement noise can be eliminated by means of simple linear or nonlinear filters. Linear filtering has the disadvantage of causing a delay in the measurements. These delays then give rise to dynamic errors in the measurement of the relative position of the target or targets which have been detected. Attempts at nonlinear filtering have provided only minor improvements.

OBJECTS OF THE INVENTION

The object of my invention is to reduce this noise by a large factor. The solution of this problem is based on an improved knowledge of the phenomenon of so-called target glint, also termed target "back-scatter".

SUMMARY OF THE INVENTION

A radar system which includes means for measuring angular positions or deviation has an antenna yielding at least two reception patterns. These patterns are utilized in at least two reception channels which are generally referred to as the "sum" channel, which supplies a "sum" signal $\Sigma$, and the "difference" channel, which supplies a "difference" signal $\Delta$; there could be two signals $\Delta S$ and $\Delta G$ if measurements are made in both elevation and azimuth. The means for carrying out the angular measurements generally form the quotient of the $\Delta$ and $\Sigma$ signals. This quotient is a measurement of the angular aiming error for the detected target relative to the axis of the two antenna patterns.

My invention is particularly applicable to a radar system which, besides a first reception channel emitting the sum signal $\Sigma$ and a second reception channel emitting the difference signal $\Delta$, includes circuitry connected to these two channels for deriving therefrom an angular-deviation signal $\epsilon$. The first reception channel is connected to an input of peak-detection means which generates a succession of enabling pulses each coinciding with a period close to an instant at which the slope of the sum signal $\Sigma$ changes from positive to negative values. An output carrying the angular-deviation signal $\epsilon$ is connected to gating means provided with a control input receiving these enabling pulses from the peak-detection means in order to pass the signal $\epsilon$ only in the presence of such an enabling pulse.

In a more sophisticated radar system, which also includes circuitry connected to the two reception channels for deriving a quadrature-deviation signal $\epsilon q$, I further provide—pursuant to a more particular feature of my invention—comparison means connected to an output of that circuitry carrying the signal $\epsilon q$ for deriving a succession of unblocking pulses from those portions of signal $\epsilon q$ whose absolute values lie below a predetermined but preferably adjustable threshold. The control input of the gating means is connected in this instance not only to the peak-detection means but also to the aforementioned comparison means for passing the deviation signal $\epsilon$ only during coincidence of an enabling pulse with an unblocking pulse whereby the width of the enabling pulse—and thus the duration of an enabling period for the passage of deviation signal $\epsilon$—is limited by the narrower one of the coinciding pulses.

A principal advantage of the present invention lies in the fact that angular measurements for which the error probability is above a certain threshold are automatically eliminated. Continuity may then be restored to the angular information by adding, downstream of the selecting means, a conventional device for storing the measurements between the successive selecting operations. The noise-reducing arrangement automatically adapts itself to the fluctuation rate of the target. It thus provides accurate measurements no matter what the behaviour of the target (whether traveling in a straight line or maneuvering, whether seen end on or from the side).

In an embodiment of my invention additionally employing a so-called quadrature-deviation channel, it is possible to make a compromise between the measuring rate and the accuracy of the resulting measurements by altering the value of a threshold. The threshold may be controlled manually or automatically as a function of the various parameters available from the radar, such as, for example, the servo-control error from an automatic tracking loop or the radar range of the target.

BRIEF DESCRIPTION OF THE DRAWING

Other features and advantages of the invention will become apparent from the following description given with reference to the accompanying drawing in which:

FIG. 1 is a block diagram of a radar receiver with three channels, namely a sum ($\Sigma$), an angular-deviation ($\epsilon$) and a quadrature-deviation ($\epsilon q$) channel;

FIG. 2 is a block diagram of another three-channel radar receiver;

FIG. 3 is a set of graphs giving examples of signals $\Sigma$, $\epsilon$ and $\epsilon q$ as functions of time;

FIG. 5 is a block diagram of a second version of a noise-reducing arrangement according to the invention;

FIG. 6 is a circuit diagram of an analog-type low-pass filter;

FIG. 7 is a circuit diagram of a digital low-pass filter;

FIG. 8 shows details of discriminating circuitry included in the embodiment of FIG. 4; and FIG. 9 shows details of discriminating circuitry included in the embodiment of FIG. 5.

SPECIFIC DESCRIPTION

Figure 4:
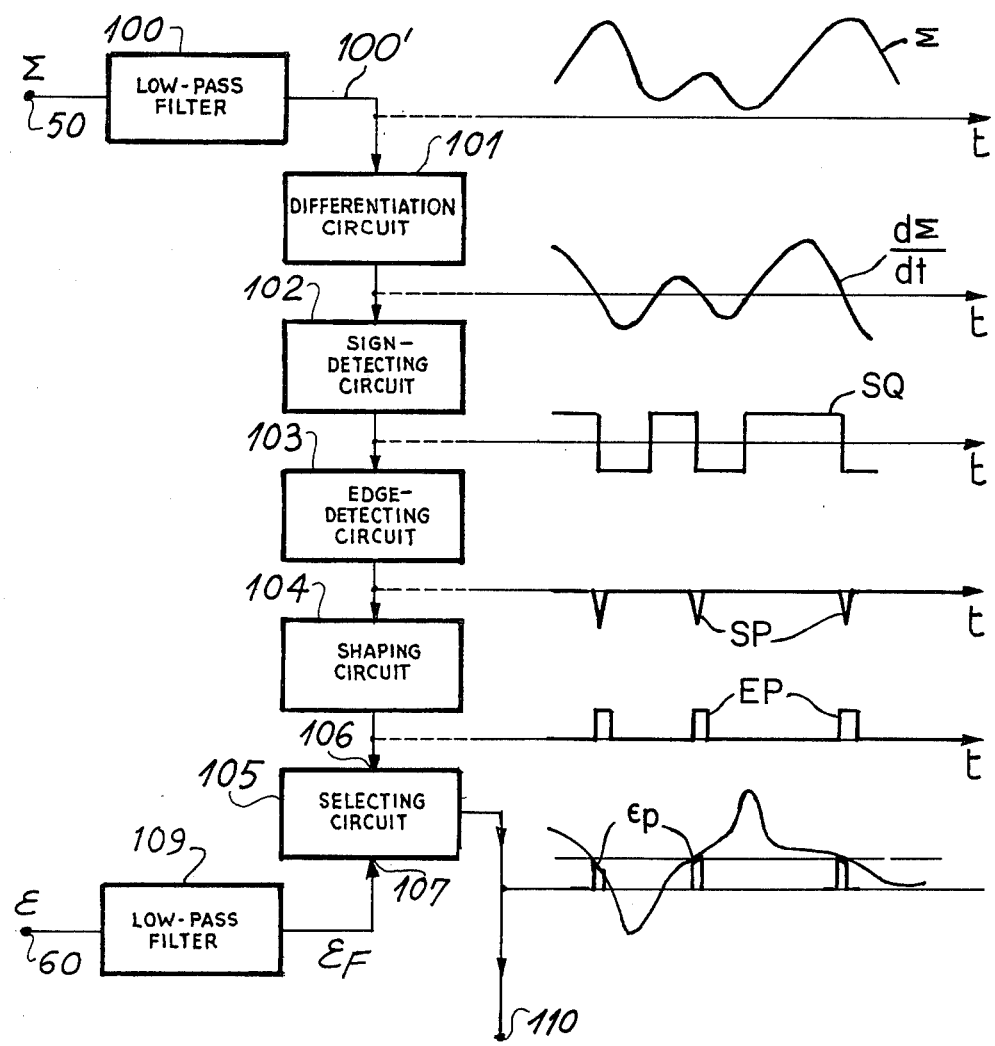
FIG. 4 is a block diagram of a first version of a noise-reducing arrangement according to the invention.

A radar designed to carry out measurements giving the angular aiming error between the axis of its antenna and the direction of a target has two reception patterns. These two patterns are produced by an antenna of the monopulse type, for example. The receiver thus has two reception channels respectively supplying a sum signal Σ and a difference signal Δ. The two reception channels are connected to means for performing the angular measurements which are utilized in the remainder of the system in any desired manner not relevant to the present invention. The case of a radar which provides only a single deviation measurement will be taken as an example for the sake of simplicity. The invention is of course equally applicable to radars which make a plurality of angular measurements.

In carrying out the angular measurements, the quotient of the Δ and Σ signals is formed. In order to obtain the sign of the angular aiming error, the measuring means operate according to the following equation:

$$\epsilon = |\Delta/\Sigma| \cos(\phi_\Sigma - \phi_\Delta) \qquad (1)$$

where
- $\epsilon$ represents the angular measurement in magnitude and sign,
- $|\Delta|$ is the modulus (absolute magnitude) of the difference signal Δ,
- $|\Sigma|$ is the modulus of the sum signal Σ, and
- $\phi_\Sigma$ and $\phi_\Delta$ are the respective phases of the sum and difference signals Σ and Δ.

This operation may be performed in a number of known ways. Two typical circuit arrangements for this purpose are illustrated in FIGS. 1 and 2.

In FIG. 1, an antenna 1, of the monopulse type for example, feeds signals representing two radiation patterns to a sum channel 2 and a difference channel 3. Frequency-changing circuits 4 and 5 transmit the sum and difference signals Σ and Δ to two variable-gain amplifiers 6 and 7 having gain-control inputs 8 and 9, respectively. The gains of the amplifiers are controlled by an automatic-gain-control (AGC) loop on the basis of the sum signal Σ. Proceeding from the output of the amplifier 6 to gain control input 8, this loop comprises, in succession, a detector circuit 12, a subtractor 13 which receives a reference signal from a terminal 14, and a loop amplifier 10. The sum signal Σ, which is extracted from the output of amplifier 10, is made available at a terminal 15.

The angular or normal-deviation (error) signal $\epsilon$ is obtained from the output of an amplitude/phase detector 16, which is supplied by amplifiers 6 and 7, and becomes available at a terminal 17.

Finally, the quadrature-deviation signal $\epsilon q$ is obtained by adding to the aforedescribed circuits a second amplitude/phase detector 19, which is fed on the one hand with the difference signal Δ from the output of amplifier 7 and on the other hand with the sum signal Σ from amplifier 6 passing through a 90° phase-shifter 18. The signal $\epsilon q$ becomes available at a terminal 20.

FIG. 2 shows a receiver for instantaneous deviation measurement which employs limiting amplifiers.

The antenna 1, which again supplies the sum and difference signals to two channels 2 and 3, is here connected (the frequency-changing circuits being omitted) to two combining circuits 31, 32 of which one, i.e. arithmetic circuit 31, forms a signal Σ+jΔ while the other, i.e. arithmetic circuit 32, forms a signal Σ−jΔ. These signals are applied respectively to two limiting amplitude/33 and 34 whose outputs are coupled to an amplitude-phase detector 37 which emits the angular information (aiming error) $\epsilon$ made available at a terminal 38.

The sum signal Σ is reconstituted at the output of a combining circuit 35 (terminal 36) which halves the sum of the signals supplied by circuits 31 and 32.

To obtain the quadrature-deviation signal $\epsilon q$, it is necessary to add to the above-discussed structure two further combining circuits 41 and 42 which are coupled to the sum and difference channels 2 and 3 to emit the signals Σ+Δ and Σ−Δ, and two limiting amplifiers 43 and 44 applying these signals to an amplitude/phase detector 45 which feeds the signal $\epsilon q$ to a terminal 46.

The measurement thus made would be exact if the target detected by the radar were a point.

However, in actual fact a number of points on the target reflect waves towards the radar. These points, situated at different distances, produce echoes which overlap in the resolving circuits of the radar with relative phase-shifts due to the differences in distance. This phenomenon is the cause of errors in the reading of signal $\epsilon$. These errors fluctuate because of the movements of the target. The phenomenon is known as "glint".

In fact, a complex target such as an aircraft or missile may be likened to a few principal, dominant reflective points on which are superimposed diffuse reflections of low level. From a study of the fluctuations in the amplitude of the sum signal it is possible to show that the angular-measurement errors bear a close relationship to these fluctuations. Similarly, a study of the fluctuations in the quadrature-deviation signal $\epsilon q$ shows that the measurement errors are also related to these fluctuations.

The $\epsilon q$ signal is obtained according to the following equation:

$$\epsilon q = |\Delta/\Sigma| \sin(\phi_\Sigma - \phi_\Delta) \qquad (2)$$

and does not contain a measurement of aiming error relative to the target. Its effective value is related to the angular distance spanned by the target.

My invention makes use of the fluctuations in the Σ and $\epsilon q$ signals to deduce the probability of errors in signal $\epsilon$ from them and to decide whether to preserve or discard the reading of signal $\epsilon$.

There are two possible versions of the technique according to my invention.

In a first version, the selection of the angular measurements given by signal $\epsilon$ is based solely on consideration of the sum signal Σ.

In a second version, more thorough selection is based on consideration of both the Σ and $\epsilon q$ signals.

The $\epsilon q$ signal may be produced by using either of the radar receivers shown in FIGS. 1 and 2 or in any other way, provided that equation (2) is satisified.

The logic for selecting any reading of signal $\epsilon$ needs to be based on the following principles:

The readings have a high probability of being correct when the amplitude of signal Σ passes through a local maximum.

The readings have a high probability of being incorrect when the amplitude of signal Σ passes through a local minimum.

The readings are either highly correct or highly incorrect close to a passage through zero of signal $\epsilon q$.

FIG. 3 shows an example of signals Σ, $\epsilon$ and $\epsilon q$ as functions of time for a given target spanning a certain angular distance, assuming the antenna to be pointing at the target. The correct reading of signal ε must therefore be situated close to 0 and in any case must lie between the boundaries of the area of width E which represents the angular span of the target.

I have also found that if the antenna is pointed away from the direction of the target, a shift occurs in the deviation channel carrying the signal ε which measures the aiming error but there is no change in the quadrature channel carrying the signal εq which is unaffected by aiming error. This relationship establishes the advantage of examining the latter channel to evaluate the measurements made.

There is a remarkably close correspondance between the equations (1) and (2) which are used as a basis for the arrangement according to the invention.

The good measurements are situated close to the maxima of the Σ signal (times $t_1$, $t_3$, $t_4$). They coincide with passages through zero of the εq signal.

However, the extremely poor measurements (times $t_2$, $t_5$) also coincide with passages through zero of signal εq. It is therefore not possible to use the "output of the quadrature" channel as the sole criterion. Ambiguity must be resolved and this can be achieved by considering the sum channel Σ.

FIG. 4 shows a noise-reducing arrangement according to the invention wherein the selection is based solely on consideration of the sum channel. The two signals Σ and ε, which are applied to two input terminals 50 and 60, are transmitted respectively to two low-pass filters 100 and 109 in order to be freed of unwanted frequency components (thermal noise, rapid fluctuations at the target caused by moving parts). The readings of signal ε are selected in the neighborhood of the maxima of signal Σ within a fixed enabling period. The selection is controlled by the change in the sign of the first differential (or slope) of signal Σ appearing in the output 100' of filter 100. FIG. 4 also shows examples of the forms of the signals at the outputs of the various circuits. The slope $d\Sigma/dt$ of the filtered sum signal is obtained by a differentiation circuit 101. This circuit is followed by a sign-detecting circuit 102 which converts the differentiated sum signal into a square wave SQ. An edge-detecting circuit 103 followed by a shaping circuit 104 detects the descending edges in the square wave generated by sign detector 102 and emits spikes SP converted by circuit 104 into calibrated enabling pulses EP of predetermined width to operate a selecting or gating circuit 105. This circuit is formed for example by an analog switch which receives the filtered deviation signal $\epsilon_F$ at a terminal 107 and the enabling pulses at a terminal 106, and which emits the processed angular-deviation signal $\epsilon_p$ on a terminal 110. Components 101–104 may be collectively termed a peak detector.

FIG. 5 shows another embodiment of my invention in which the selection is based on simultaneous consideration of the sum signal and the Σ quadrature signal εq. As in the case of FIG. 4, examples of the forms of the signals are given beside the output of each of the component circuits. The three signals Σ, ε and εq are applied respectively to three identical low-pass filters 200, 210 and 220 having respective outputs 200', 210' and 222. Selection takes place on either side of the maximum of signal Σ within a variable enabling period. The filtered sum signal is fed to a double-differentiation circuit 201 generating the inverted second differential thereof whose positive and negative peaks approximately coincide with the maxima and minima, respectively, of signal Σ. The output signal $d^2\Sigma/dt^2$ of circuit 201 is then applied to a sign-detecting circuit 202 which converts these peaks into flat pulses PP, NP of corresponding polarity fed to a logical AND gate 203. The εq signal, after passing through filter 210, is subjected to full-wave rectification in a circuit 206 and its absolute valve |εq| is then compared with a threshold so that only those signal levels which lie below the threshold are retained. The threshold which is determined by a signal applied to a reference terminal 207 of a comparator 205, may be fixed or adjustable. It thus controls the variable enabling period for accepting the deviation readings. The output signals from comparator 205 are inverted in a circuit 204 to form unblocking pulses UP that are applied to a second input of AND gate 203. The enabling pulses EP emitted by the AND gate 203 upon coincidence of pulses UP and PP are fed to a control input 223 of a selecting or gating circuit 221 which receives the filtered deviation signal $\epsilon_F$ at terminal 222 and emits the processed deviation signal $\epsilon_p$ on an output terminal 225. In this instance the peak detector consists of components 201, 202.

In both embodiments (FIGS. 4 and 5), continuity may be restored to the information appearing at the output of the selecting circuit by means of an additional storage circuit which holds the processed signal samples $\epsilon_p$ constant from one selection to the next. Such storage has been represented by broken lines interconnecting the selected signal levels at output 225 in FIG. 5.

The first embodiment (FIG. 4) takes only the sum signal Σ into account. This signal may be replaced by any other signal representative of the amplitude of the detected signals. It may for example be the automatic-gain-control voltage (terminal 15, FIG. 1), or again the output signal of a receiver designed for signal detection.

The realization of the arrangement shown in FIG. 5 requires an auxiliary channel for quadrature-deviation measurement as described with reference to FIGS. 1 and 2, for example, operating according to equation (2).

In both embodiments the selection function automatically adapts itself to the rate of the pulses from the target and thus provides accurate deviation measurements whatever the behavior of the target.

In the second version (FIG. 5), the possibility of adjusting the threshold (reference terminal 207) allows a compromise to be made between the reading rate, of which is proportional to the enabling period of the selecting circuit 221, and the accuracy of the measurements based on these readings. The threshold may be controlled manually or automatically, e.g. as a function of the servo-control error from a tracking loop designed to bring the radar back onto the direction of the target as quickly as possible while accepting errors, which are unimportant in this phase of tracking, and thus to reduce the errors occurring when the target is being properly tracked.

The techniques used in designing the circuit arrangement according to the invention depend upon the type of radar with which it is associated. In certain applications I prefer to use analog techniques. In a fire-control radar serving to track a number of targets on a time-sharing basis for example, a digital construction would be preferable. The low-pass filters (100, 109 in FIG. 4 and 200, 210, 220 in FIG. 5) are identical in both embodiments of my invention. In order not to create problems connected with the stability of the servo-control of the antenna during angular tracking, a cut-off of 6 dB per octave is adopted.

FIG. 6 shows an analog-type low-pass filter. Between an input terminal 300 and an output terminal 307 it comprises a first low-pass (integrating) RC network (resistor 301, capacitor 302) connected directly to an adding input (gain +2) of a subtracting amplifier 36 and via a buffer amplifier 303 of unity gain and another low-pass RC network (resistor 304, capacitor 305) to a subtracting input (gain −1) of the same amplifier 36.

The transfer function of this filter is $$1+2j\omega\tau)/(1+2j\omega\tau-\omega^2\tau^2)$$

where $\tau = RC$.

If W is the bandwidth of the spectrum of the target, then $$\tau = 1/2\pi W$$

As an example, for a small aircraft and a radar whose wavelength equals 3 cm:
W = 10 Hz
$\tau$ = 16 milliseconds FIG. 7 shows a low-pass filter of digital type.

The incoming signals are applied to an input 400, are amplified (with a gain factor $\alpha$) in a device 401, and are transmitted to one input of an adder 402 which receives at its second input a feedback signal derived from its output via a circuit 407 introducing a delay T and an amplifying circuit 408 of gain factor $g = 1 - \alpha$. The output of adder 402 is coupled to one input of an adder 404 via an amplifying circuit 403 of gain $\alpha$. The second input of adder 404 is coupled to its output via a circuit 406, introducing a delay T, in series with an amplifier 405 of gain $G = 1 - \alpha$.

A subtracting circuit 409 is connected to the outputs of adders 402 and 404 and emits the filtered signals on a terminal 410.

In a pulse radar, the delays T are equal to the repetition period. This being the case, $\tau \simeq T/\alpha$ and hence $\alpha = T/\tau = 2$ WT. The sampling rate in the digital circuits at the output of this filter may be reduced by adopting a submultiple of delay T. For example, with a bandwidth W = 10 Hz and hence with $\tau$ = 16 milliseconds, it is possible to extract only one sample of every sixteen for further processing.

FIG. 8 shows details of the discriminating circuitry represented by blocks 101-105 in FIG. 4. The signal $\Sigma$ present on filter output 100' is transmitted by a gate 121 controlled by a clock 120 to differentiating and sign-detecting circuitry comprising a memory 122, which receives the signal transmitted by gate 121, and a flip-flop 123 connected to the input and output of memory 122. Each sample of the $\Sigma$ signal is thus compared by flip-flop 123 with an immediately preceding sample obtained from the output of memory 122 with a delay equal to the sampling period of the clock 121. The memory 122 may be in the form of a charge-coupled register. The changeover of flip-flop 123 following the passage of signal $\Sigma$ through a maximum or peak is detected by a high-pass (differentiating) RC network, here comprising a capacitor 124 and a resistor 125, and triggers a circuit 126 for operating the selection gate 105 inserted between input 107 and output 110.

FIG. 9 shows details of the discriminating circuitry represented by blocks 201-206, 221 in FIG. 5. The $\Sigma$ signals appearing on filter output 200' are sampled by a gate 231 controlled by a clock 230. The resulting samples are passed to a pair of cascaded memories 232 and 233 which introduce two delays equal to the sampling period T. An adding circuit 234 is connected to the input and output of the memory chain. An amplifying circuit 235 of gain 2 is connected to the junction of the two memories. A flip-flop 236 compares an intermediate sample from the output of amplifier 235 with the sum of the preceding and following samples from the output of adder 234. The detection of a convex zone or positive peak (proximity of a maximum) by flip-flop 236 satisfies one of the conditions for passage of deviation signal $\epsilon$ by energizing one input of AND gate 203 which operates the selection gate 221 between terminals 222 and 225 upon simultaneously receiving on its input a decision signal derived from examination of the ancillary signal $\epsilon q$. This signal is obtained, from the filtered $\epsilon q$ signal on line 210' by means of full-wave rectifier circuit 206 and comparator 205 having an adjustable threshold (input 207). The comparator 205 may be formed by a flip-flop which supplies an enabling signal to AND gate 203 when the rectified signal $|\epsilon q|$ is below the threshold of input 207.

The arrangement according to the invention may be applied to all tracking radars measuring angular deviation. The embodiment of FIG. 4, which does not require the inclusion of an additional channel, may be used without difficulty in existing radars. The second embodiment requires additional circuitry as shown in FIGS. 1 and 2.

Although a radar containing only two $\Sigma$ and $\Delta$ reception channels has been described, it is perfectly clear that the present invention is applicable to radars incorporating a larger number of such channels and in particular to those having one sum channel and two difference channels.

What is claimed is:

1. A circuit arrangement for improving the accuracy of angular measurements in a radar system with a first reception channel emitting a sum signal $\Sigma$, a second reception channel emitting a difference signal $\Delta$, and circuitry connected to said reception channels for deriving therefrom an angular-deviation signal $\epsilon$ appearing on an output thereof, comprising:
   peak-detection means connected to said first reception channel for generating a succession of enabling pulses each coinciding with a period close to an instant at which the slope of said sum signal $\Sigma$ changes from positive to negative values; and
   gating means connected to said output and provided with a control input connected to said peak-detection means for passing said angular-deviation signal $\epsilon$ only in the presence of one of said enabling pulses.

2. A circuit arrangement as defined in claim 1 wherein said peak-detection means comprises differentiation means for determining said slope, sign-detecting means connected to said differentiation means for generating a square wave changing in polarity with a sign change of said slope, edge-detecting means connected to said sign-detecting means for emitting a spike upon each changeover of said slope from positive to negative values, and pulse-shaping means connected to said edge-detecting means for converting each of said spikes into an enabling pulse of predetermined width.

3. A circuit arrangement for improving the accuracy of angular measurements in a radar system with a first reception channel emitting a sum signal $\Sigma$, a second reception channel emitting a different signal $\Delta$, and circuitry connected to said reception channels for deriving therefrom an angular-deviation signal $\epsilon$ and a quadrature-deviation signal $\epsilon q$ respectively appearing on a first and a second output thereof, comprising:

peak-detection means connected to said first reception channel for generating a succession of enabling pulses each coinciding with a period close to an instant at which the slope of said sum signal $\Sigma$ changes from positive to negative values;

comparison means connected to said second output for deriving a succession of unblocking pulses from those portions of said quadrature-deviation signal $\epsilon q$ whose absolute values lie below a predetermined threshold; and gating means connected to said output and provided with a control input connected to said peak-detection means and to said comparison means for passing said angular-deviation signal $\epsilon$ only during coincidence of one of said enabling pulses with one of said unblocking pulses.

4. A circuit arrangement as defined in claim 3 wherein said comparison means comprises a comparator preceded by a full-wave rectifier and provided with a reference terminal for receiving a selected threshold-determining signal.

5. A circuit arrangement as defined in claim 1, 3 or 4 wherein said peak-detection means comprises double-differentiation means for determining the time derivative of said slope and sign-detecting means connected to said double-differentiation means for deriving said unblocking pulses from positive peaks of said time derivative.

6. A circuit arrangement as defined in claim 3 or 4 wherein said circuitry includes an amplitude/phase detector with an input connected directly to said second channel and another input connected via a 90° phase shifter to said first channel, said second output being an output of said amplitude/phase detector.

7. A circuit arrangement as defined in claim 3 or 4 wherein said circuitry includes a first arithmetic circuit connected to said reception channels for additively combining said sum and difference signals $\Sigma$ and $\Delta$, a second arithmetic circuit connected to said reception channels for subtractively combining said sum and difference signals $\Sigma$ and $\Delta$, and an amplitude/phase detector with input connections to both said arithmetic circuits, said second output being an output of said amplitude/phase detector.

* * * * *